(12) United States Patent
Johnson et al.

(10) Patent No.: US 11,415,301 B2
(45) Date of Patent: Aug. 16, 2022

(54) ELECTRONICALLY-CONTROLLED PORTABLE LIGHTING TOWER

(71) Applicant: BRIGGS & STRATTON, LLC, Wauwatosa, WI (US)

(72) Inventors: Todd Johnson, Wauwatosa, WI (US); Mark Noller, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/168,849

(22) Filed: Feb. 5, 2021

(65) Prior Publication Data

US 2021/0247059 A1   Aug. 12, 2021

Related U.S. Application Data

(60) Provisional application No. 62/971,383, filed on Feb. 7, 2020.

(51) Int. Cl.
*F21V 21/14* (2006.01)
*F21L 4/02* (2006.01)
(Continued)

(52) U.S. Cl.
CPC .............. *F21V 21/145* (2013.01); *F21L 4/02* (2013.01); *F21V 21/06* (2013.01); *F21V 23/0414* (2013.01); *F21V 23/0492* (2013.01); *B62D 49/08* (2013.01); *F21L 4/04* (2013.01); *F21L 4/08* (2013.01); *F21S 6/00* (2013.01);
(Continued)

(58) Field of Classification Search
CPC ........ F21V 21/145; F21V 21/15; F21V 21/06; F21V 21/22; F21V 21/36; F21V 13/00; F21V 14/04; F21L 4/02; F21L 4/04; F21L 4/08; F21S 6/00; F21S 6/005; F21S 6/006; F21S 6/007; F21S 6/008; B62D 49/08; G01M 1/12; G01M 1/122; F21W 2131/1005; F21W 2131/402
See application file for complete search history.

(56) References Cited

U.S. PATENT DOCUMENTS 6,464,196 B1 * 10/2002 Crookham ................ E04G 1/24
                                                        248/519
7,667,341 B2    2/2010 Serdynski et al.
(Continued)

FOREIGN PATENT DOCUMENTS

GB          2491421 A  * 12/2012   .......... F21V 23/0492
WO    WO-2018/031719 A1    2/2018
(Continued)

*Primary Examiner* — Colin J Cattanach
(74) *Attorney, Agent, or Firm* — Foley & Lardner LLP

(57) ABSTRACT

A portable lighting tower includes a frame, an adjustable mast, multiple legs, a controller, and a battery pack. The adjustable mast is coupled to the frame and includes a light. The multiple legs each include an actuator operable to deploy and retract the respective leg. The controller is operatively coupled to the light and the actuators and configured to control operation of the light and the actuators. The battery pack is electrically coupled to the controller, the light, and the actuators. The light is dimmable between a maximum setting and a minimum setting, and the controller operates each of the linear actuators to deploy or retract the respective leg response to a user input.

18 Claims, 7 Drawing Sheets

(51) Int. Cl.

| | |
|---|---|
| *F21V 23/04* | (2006.01) |
| *F21V 21/06* | (2006.01) |
| *F21V 21/22* | (2006.01) |
| *F21V 14/04* | (2006.01) |
| *F21W 131/402* | (2006.01) |
| *F21S 6/00* | (2006.01) |
| *F21V 21/15* | (2006.01) |
| *F21V 21/36* | (2006.01) |
| *G01M 1/12* | (2006.01) |
| *F21L 4/04* | (2006.01) |
| *F21W 131/10* | (2006.01) |
| *F21V 13/00* | (2006.01) |
| *B62D 49/08* | (2006.01) |
| *F21L 4/08* | (2006.01) |

(52) U.S. Cl.
CPC ............... *F21S 6/005* (2013.01); *F21S 6/007* (2013.01); *F21S 6/008* (2013.01); *F21V 13/00* (2013.01); *F21V 14/04* (2013.01); *F21V 21/15* (2013.01); *F21V 21/22* (2013.01); *F21V 21/36* (2013.01); *F21W 2131/1005* (2013.01); *F21W 2131/402* (2013.01); *G01M 1/12* (2013.01); *G01M 1/122* (2013.01)

(56) References Cited

U.S. PATENT DOCUMENTS

| | | | | |
|---|---|---|---|---|
| 9,115,879 | B1* | 8/2015 | Barker | G09F 13/0409 |
| 9,484,602 | B1 | 11/2016 | Podolefsky | |
| 9,624,891 | B2 | 4/2017 | Koenen et al. | |
| 9,726,135 | B2 | 8/2017 | Zeiler et al. | |
| 9,989,230 | B2 | 6/2018 | Yamamoto | |
| 10,393,324 | B1* | 8/2019 | Chambers | F21L 4/08 |
| 10,400,732 | B2 | 9/2019 | Harvey et al. | |
| 10,634,122 | B1* | 4/2020 | Clifton | E04H 12/345 |
| 2004/0170022 | A1 | 9/2004 | Yoshimori et al. | |
| 2005/0063189 | A1* | 3/2005 | Ossolinski | F21V 3/023 |
| | | | | 362/363 |
| 2008/0232082 | A1 | 9/2008 | Martinez | |
| 2009/0284963 | A1* | 11/2009 | Intravatola | F16M 11/42 |
| | | | | 362/190 |
| 2010/0020267 | A1* | 1/2010 | Kobayashi | G02F 1/133603 |
| | | | | 349/64 |
| 2010/0187375 | A1 | 7/2010 | Yoshimori et al. | |
| 2010/0220489 | A1* | 9/2010 | Konop | F21V 21/22 |
| | | | | 362/428 |
| 2012/0168576 | A1* | 7/2012 | Intravatola | F16M 11/2014 |
| | | | | 248/125.8 |
| 2012/0201015 | A1* | 8/2012 | Robertson | F21V 21/30 |
| | | | | 362/183 |
| 2012/0201016 | A1* | 8/2012 | Robertson | B62D 63/08 |
| | | | | 362/183 |
| 2013/0039049 | A1* | 2/2013 | Jones | F21L 14/04 |
| | | | | 362/184 |
| 2013/0193856 | A1* | 8/2013 | Chalmers | H05B 47/105 |
| | | | | 315/153 |
| 2013/0250561 | A1 | 9/2013 | Knodel | |
| 2013/0322073 | A1* | 12/2013 | Hamm | F21V 21/145 |
| | | | | 362/235 |
| 2014/0240968 | A1* | 8/2014 | Brown | F21S 9/032 |
| | | | | 362/183 |
| 2015/0023017 | A1* | 1/2015 | Smith | F21V 21/22 |
| | | | | 362/249.03 |
| 2015/0152998 | A1* | 6/2015 | Intravatola | F21V 17/007 |
| | | | | 248/528 |
| 2015/0171632 | A1 | 6/2015 | Fry et al. | |
| 2015/0215587 | A1 | 7/2015 | Carpoff | |
| 2015/0330558 | A1 | 11/2015 | Intravatola | |
| 2016/0186945 | A1* | 6/2016 | Knodel | B60P 3/18 |
| | | | | 362/485 |
| 2016/0281938 | A1 | 9/2016 | Carpoff | |
| 2016/0309566 | A1* | 10/2016 | Fletcher | F21L 14/04 |
| 2017/0023191 | A1 | 1/2017 | Magnotta | |
| 2017/0031085 | A1* | 2/2017 | Lim | G02B 6/32 |
| 2017/0306916 | A1 | 10/2017 | Zeiler et al. | |
| 2018/0058646 | A1* | 3/2018 | Lai | F21V 21/145 |
| 2018/0119935 | A1* | 5/2018 | Proeber | F21V 23/001 |
| 2018/0128435 | A1* | 5/2018 | Workman | F21V 21/30 |
| 2018/0172266 | A1* | 6/2018 | Folk | F21L 13/00 |
| 2018/0192580 | A1 | 7/2018 | Zeiler et al. | |
| 2018/0266637 | A1* | 9/2018 | Curlett | H01M 10/425 |
| 2019/0160972 | A1 | 5/2019 | Zeiler et al. | |
| 2019/0178220 | A1 | 6/2019 | Zeiler et al. | |
| 2019/0217319 | A1 | 7/2019 | Harvey et al. | |
| 2019/0230850 | A1 | 8/2019 | Johnson et al. | |
| 2019/0296290 | A1 | 9/2019 | Hansen et al. | |
| 2019/0346122 | A1* | 11/2019 | Proeber | F21V 21/22 |
| 2019/0353128 | A1 | 11/2019 | Harvey et al. | |
| 2020/0232597 | A1* | 7/2020 | Sharrah | F16M 11/24 |
| 2020/0248471 | A1* | 8/2020 | Chambers | F21L 4/02 |

FOREIGN PATENT DOCUMENTS

| | | |
|---|---|---|
| WO | WO-2019/035021 | 2/2019 |
| WO | WO-2019/075316 | 4/2019 |
| WO | WO-2019/213407 A1 | 11/2019 |

* cited by examiner

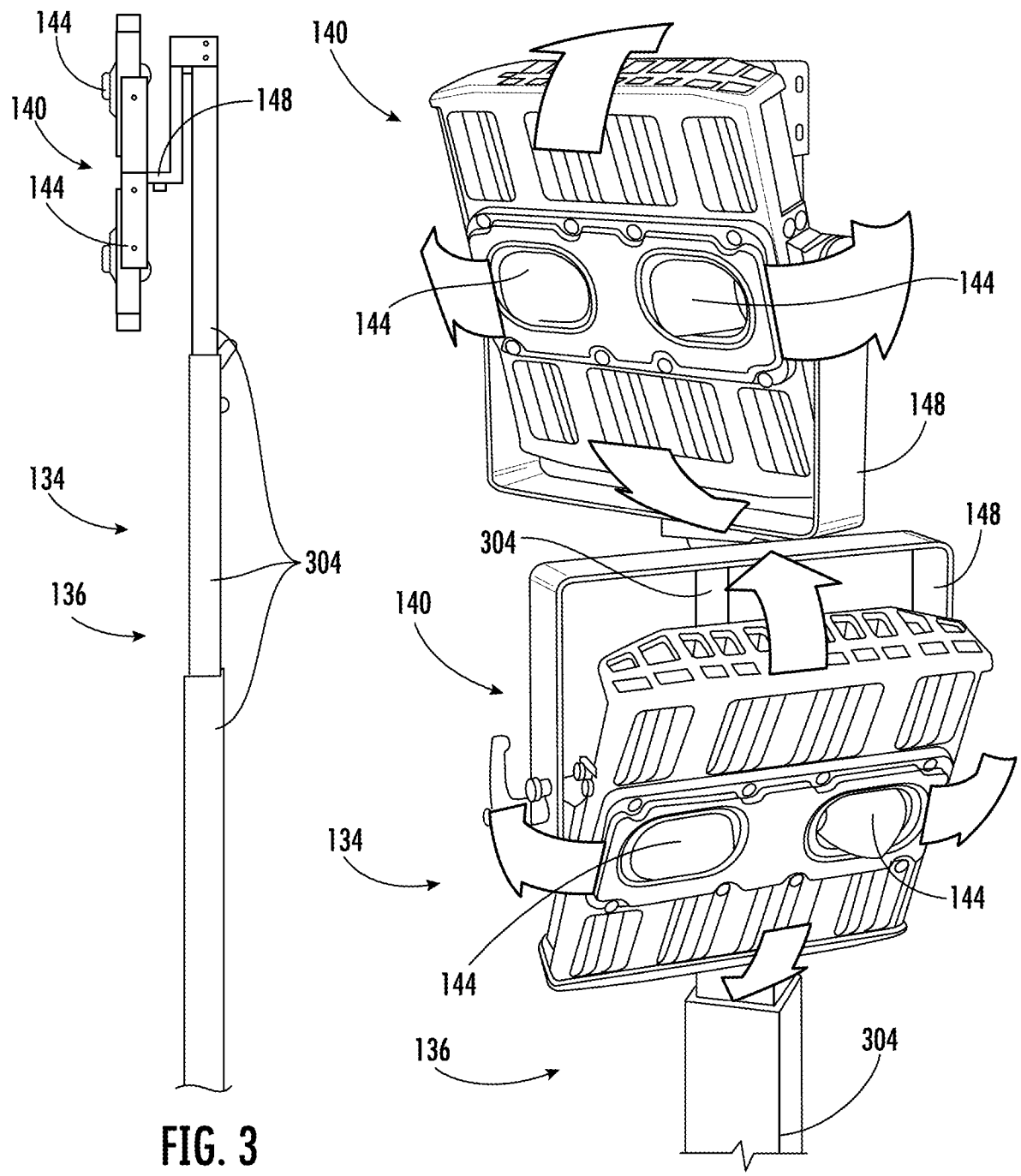

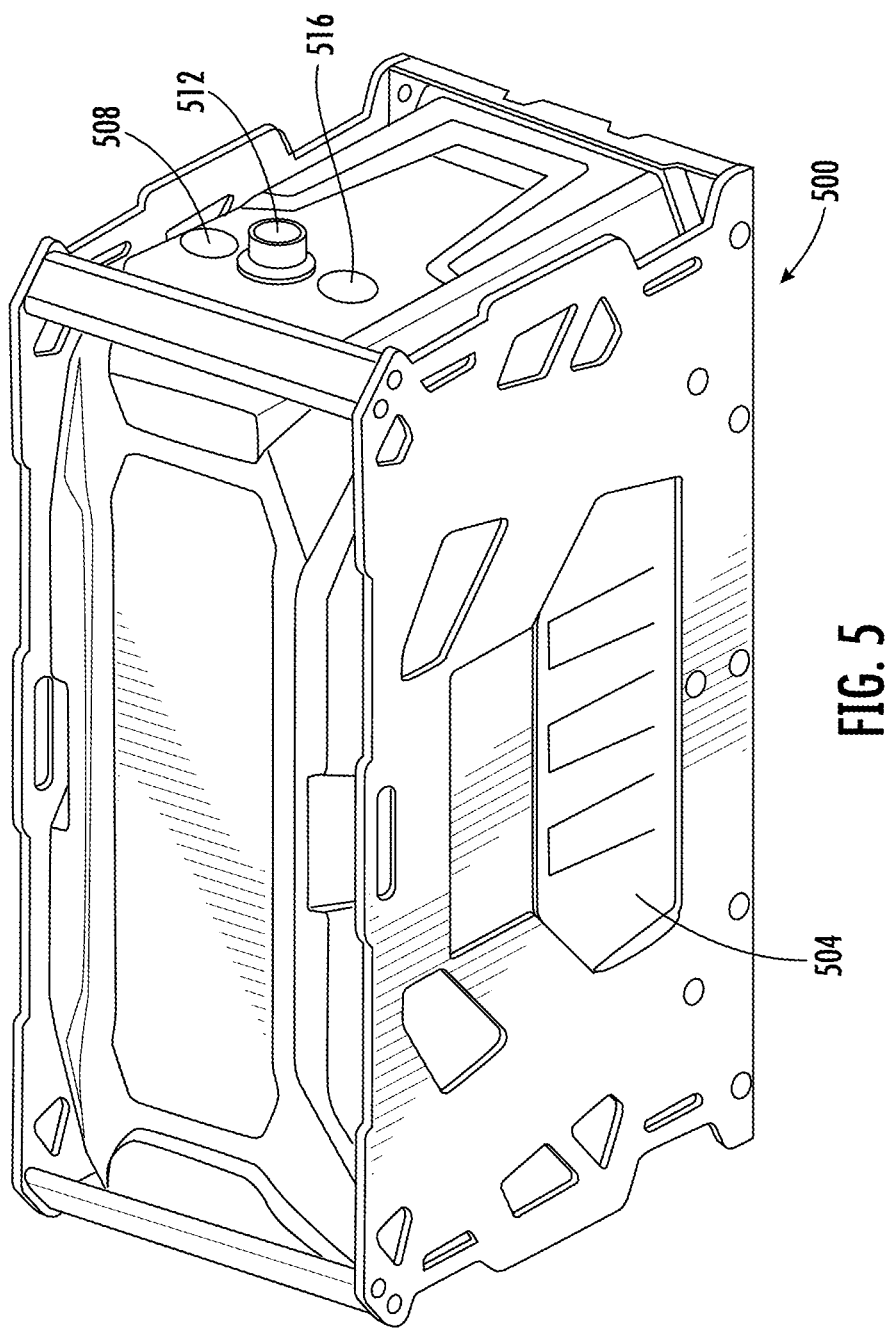

ELECTRONICALLY-CONTROLLED PORTABLE LIGHTING TOWER

CROSS-REFERENCE TO RELATED PATENT APPLICATIONS

This application claims priority to U.S. Provisional Patent Application No. 62/971,383, filed on Feb. 7, 2020, the content of which is hereby incorporated by reference in its entirety.

BACKGROUND

The present disclosure relates generally to portable lighting equipment. More specifically, the present disclosure relates to electronically-controlled portable lighting towers having a controller and the systems used within.

SUMMARY OF THE INVENTION

One embodiment relates to a portable lighting tower including a frame, an adjustable mast, multiple legs, a controller, and a battery pack. The adjustable mast is coupled to the frame and includes a light. The multiple legs each include an actuator operable to deploy and retract the respective leg. The controller is operatively coupled to the light and the actuators and configured to control operation of the light and the actuators. The battery pack is electrically coupled to the controller, the light, and the actuators. The light is dimmable between a maximum setting and a minimum setting, and the controller operates each of the linear actuators to deploy or retract the respective leg response to a user input.

Another embodiment relates to a portable lighting tower including a frame, an adjustable mast, a controller, and a battery pack. The adjustable mast is coupled to the frame and includes a light. The controller is operatively coupled to the light to control operation of the light. The battery pack is electrically coupled to the controller and the light. The light is dimmable between a maximum setting and a minimum setting. The controller determines a remaining runtime of the battery pack, receives an input runtime of the battery pack, and dims or brightens the light based on the input runtime of the battery pack and the remaining runtime of the battery pack.

Another embodiment relates to a portable lighting tower including a frame, multiple legs coupled to the an adjustable mast, a controller, and a tilt sensor. Each leg includes an actuator operable to deploy and retract the respective leg. The adjustable mast is coupled to the frame and includes a light. The controller is operatively coupled to the light and the actuators and is configured to control operation of the light and the actuators. The tilt sensor is operatively coupled to the controller and structured to determine a grade of the portable lighting tower relative to horizontal. The controller operates each of the actuators to deploy or retract the respective leg in response to a user input and in response to determining the grade of the portable lighting tower relative to horizontal is less than a maximum grade.

BRIEF DESCRIPTION OF THE DRAWINGS

The disclosure will become more fully understood from the following detailed description, taken in conjunction with the accompanying figures, wherein like reference numerals refer to like elements, in which:

FIG. 3 is a side view of a lighting mast of the portable lighting tower of FIG. 1 in a deployed configuration.

FIG. 4 is a perspective view of multiple lighting assemblies of the lighting mast of FIG. 3.

FIG. 5 is a perspective view of a battery of the portable lighting tower of FIG. 1.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is an electronically-controlled portable lighting tower. The portable lighting tower operates on direct current (DC) electric power provided from one or more batteries (e.g., removable batteries). The portable lighting tower described herein is quieter than an internal combustion engine (e.g., mechanically) powered lighting tower and can include an electric controller to better control operation of the portable lighting tower. In some embodiments, the electric controller includes a tilt sensor and a variety of circuits providing the user a variety of controls of the portable lighting tower 100. In this way, the user can better operate, setup, and make decisions based on the information provided and received from the electric controller. In even other embodiments, the portable lighting tower includes a user interface that provides the user with a wealth of information about the electronically-controlled portable lighting tower and allows the user to interface with the electric controller. For example, the user interface may provide the user with remaining runtime, local weather conditions, power output, and the like. As a result, the user may utilize the information to better operate the portable lighting tower and to provide a more customized portable lighting experience.

It should be understood that although the portable lighting tower shown and described herein is battery powered, the present disclosure also encompasses mechanically (e.g., internal combustion engine) powered lighting towers and hybrid powered lighting towers. For example, the control systems implemented on the battery powered lighting tower shown and described could be utilized with a mechanically powered or hybrid powered portable lighting tower. Additionally, as used herein "electrically coupled," "communicably coupled," and "operatively coupled" may overlap or describe a similar coupling. For example, to be operatively coupled to an example electric motor, an example controller may be also electrically coupled to provide power to operate the example electric motor. Therefore, any reference to "electrically coupled," "communicably coupled," and "operatively coupled" may be a reference to any one of the three.

Figure 1:
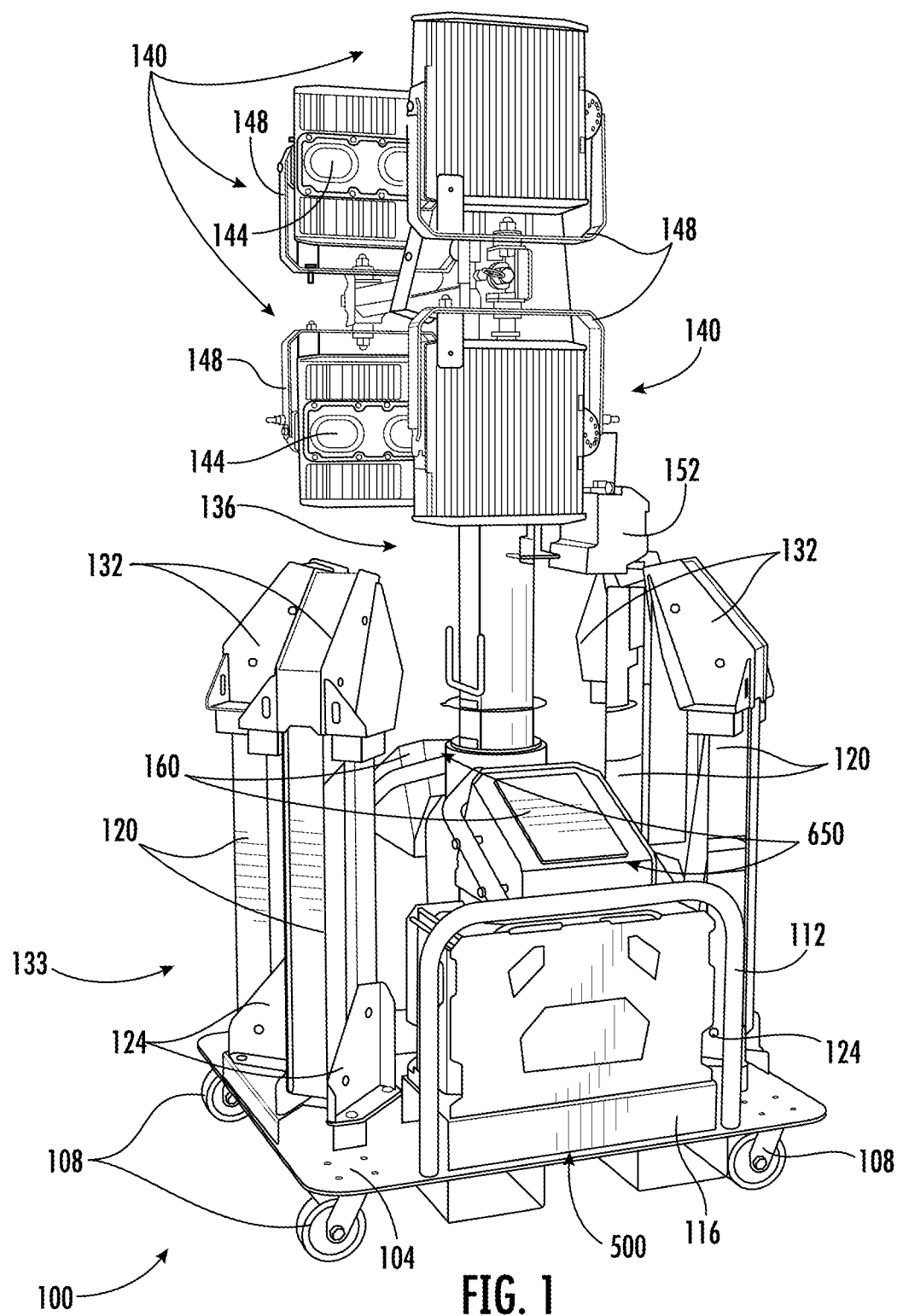
FIG. 1 is a perspective view of a portable lighting tower, according to an exemplary embodiment.
Figure 2:
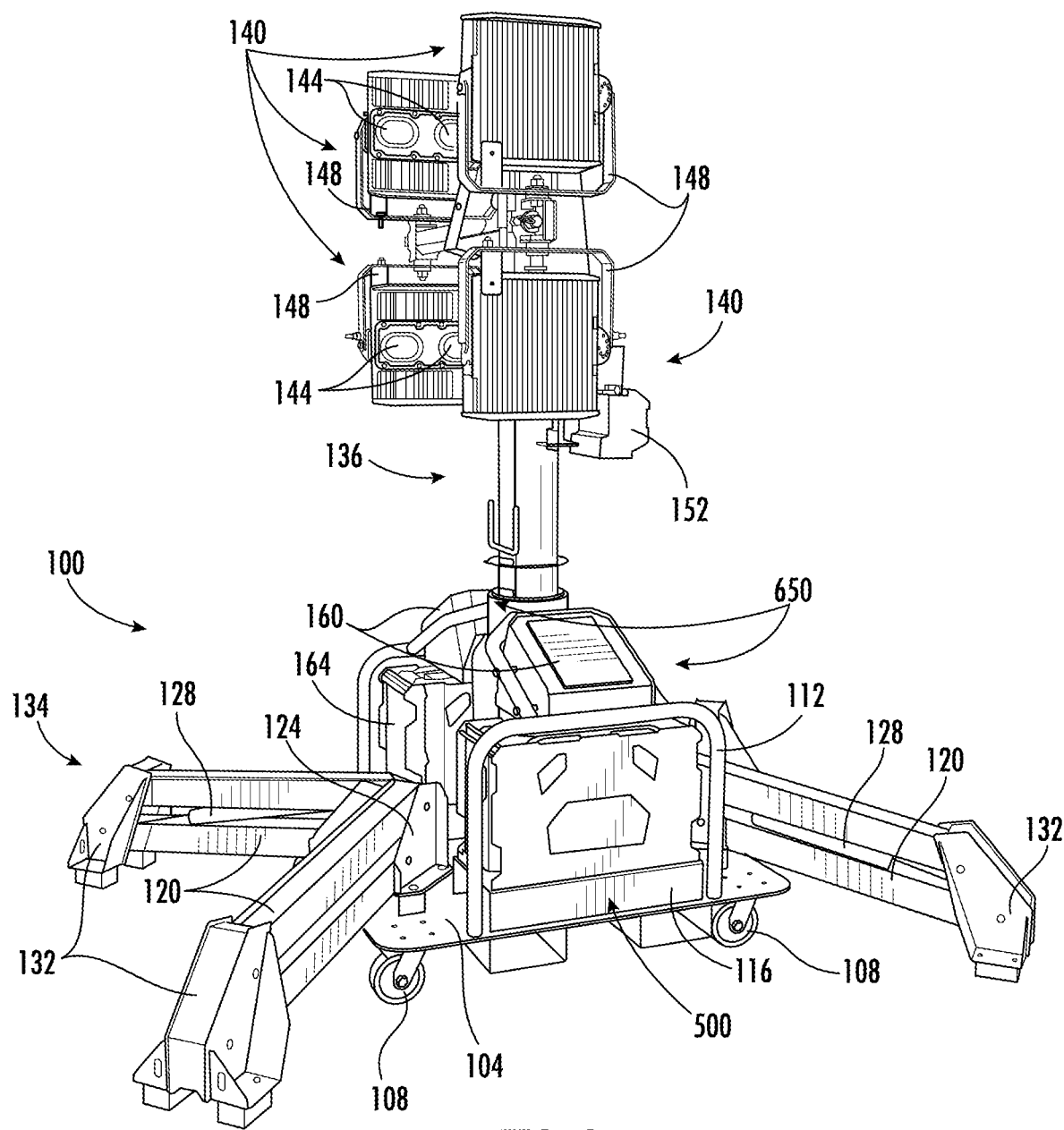
FIG. 2 is a perspective view of the portable lighting tower of FIG. 1 with multiple supports deployed.

Referring to FIGS. 1-2, the electronically-controlled portable lighting tower 100 is shown, according to an exemplary embodiment. The portable lighting tower 100 includes a frame 104 having multiple wheels 108, one or more handles 112, and one or more battery connections 116. The frame 104 provides a base structure for many components of the portable lighting tower 100, and physically decouples the many components of the portable lighting tower 100 from the ground. To make the lighting tower 100 portable, the frame 104 includes wheels 108. The wheels 108 lift the frame 104 off of the ground and allow the portable lighting tower 100 to be easily moved. The wheels 108 may be any type of wheels including simple caster wheels and larger wheels including a tire and a rim. The frame 104 further includes the handles 112. The handles 112 allow a user of the portable lighting tower 100 to easily move the portable lighting tower 100 around on the wheels 108 by providing a place to for the user to grasp the frame 104. In further embodiments, the handles 112 further act as a metal guard to the battery connections 116.

The frame 104 further includes the battery connections 116. The battery connections 116 provide both an electrical connection and a mechanical connection between the portable lighting tower 100 and one or more batteries 500. The electrical coupling between the batteries 500 and the portable lighting tower 100 will be described further herein. As shown, each battery connection 116 couples the respective battery 500 to the frame 104. In some embodiments, each battery 500 is removably coupled to the frame 104 by the respective battery connection 116 to allow the battery 500 to be changed with another battery 500. For example, the battery connection 116 may include a quick connector that holds the respective battery 500 in place during operation of the portable lighting tower 100. The quick connector may then be actuated (e.g., moved, opened, driven, operated) to allow the battery to be decoupled from the portable lighting tower 100. In this way, each battery 500 can be switched with a new battery 500 in case the battery 500 needs to be charged, goes bad, or needs to be changed for various other reasons. In some embodiments, the batteries 500 are to be decoupled from the portable lighting tower 100 when the portable lighting tower 100 is being moved. Once at the new location, the batteries 500 can then be removably coupled to the lighting tower 100 through the respective quick connector. In some embodiments, each battery 500 removably couples to the respective battery connection 116 through one or more fasteners (e.g., a bolt.) In even other embodiments, the frame of each battery 500 includes a male connector (e.g., a plastic extension, a threaded end) that connects into a female connector (e.g., a slit, an opening, a threaded hole) of the respective battery connector 116. In even other embodiments, each battery 500 removably couples to the respective battery connection 116 through an electrical connection (e.g., one or more wires, a male electrical connection)

Still referring to FIGS. 1-2, the frame 104 is further coupled to one or more supports 120 (also referred to as legs) through one or more gusset plates 124. The gusset plates 124 providing the connection structure between the supports 120 and the frame 104. Each support 120 further includes a foot 132 and a linear actuator 128 that moves the support 120 between a storage configuration 133 (FIG. 1) and a deployed configuration 134 (FIG. 2). Each foot 132 provides a stable platform which touches the ground in the deployed configuration. In some embodiments, each foot 132 includes a high friction outer layer that contacts the ground in the deployed configuration.

The linear actuators 128 are located within the supports 120. The linear actuators 128 are operable between the storage configuration 133 and the deployed configuration 13 to place the foot 132 of the support 120 in contact with the ground. In this way, the supports 120 and the feet 132 (while in the deployed configuration 133) stabilize and prevent the portable lighting tower 100 from moving. In one embodiment, the linear actuators 128 are electromechanical actuators controlled by an electric motor. In further embodiments, the linear actuators 128 may be any type of actuator including mechanical actuators, hydraulic actuators, pneumatic actuators, piezoelectric actuators, twisted and coiled polymer actuators, rotary actuators (e.g., hydraulic or electric), electric motors in place of the actuators, etc. The operation of the linear actuators 128 and their respective supports 120 will be described in further detail herein. In some embodiments, the linear actuators 128 are infinitely adjustable between the storage configuration 133 (i.e., fully contracted) and the deployed configuration 134 (i.e., fully extended). As used herein, the term "deploy," or "deployment" may refer to a change in configuration of the portable lighting tower 100 (e.g., the supports 120, the linear actuators 128, the feet 132, the adjustable mast 136, the light assemblies 140, the tower winch 152) from the storage configuration 133 to the deployed configuration 134. The term "retract" may refer to a change in configuration of the portable lighting tower 100 (e.g., the supports 120, the linear actuators 128, the feet 132, the adjustable mast 136, the light assemblies 140, the tower winch 152) from the deployed configuration 134 to the storage configuration 133.

The frame 104 is further coupled to the adjustable mast 136. The adjustable mast 136 is adjustable between a storage configuration 133 (FIG. 1) and a deployed configuration 134 (FIGS. 2-3) and includes one or more light assemblies 140. Each light assembly 140 includes one or more lights 144 and an adjustable frame 148. In one embodiment, each light assembly 140 includes two lights 144. In other embodiments, each light assembly 140 can include more or less than two lights 144. The adjustable frame 148 allows the light assembly 140 to be moved and adjusted. For example, each adjustable frame 148 may allow each respective light assembly 140 to be swiveled, rotated about the adjustable mast 136, and moved in any direction (within the range of the adjustable frame 148).

The adjustable mast 136 further includes a tower winch 152. The tower winch 152 is coupled to the adjustable mast 136 and deploys or retracts the adjustable mast 136. In some embodiments, the tower winch 152 is a winch including a rope or metal wire that deploys or retracts the adjustable mast 136. In other embodiments, the tower winch 152 includes a rope that attaches to the top of the adjustable mast 136 and deploys or retracts the adjustable mast 136 in response to user input.

The portable lighting tower 100 further includes a user interface 650. The user interface 650 will be described in more detail herein, but includes one or more displays 160. The displays 160 provide a variety of information to a user of the portable lighting tower 100 including information on remaining runtime, various settings of the portable lighting tower 100, and other relevant information. In some embodiments, the displays 160 are touch screens or other types of input devices that allow the user to input information. In other embodiments, the displays 160 output information to a user.

Referring now to FIG. 2, the portable lighting tower 100 further includes a power output 164. The power output 164 provides the user a location to plug in external devices to receive power from the portable lighting tower 100. For example, the user may plug in external power equipment, more lighting equipment, or other power using equipment. In some embodiments, the power output 164 provides direct current (DC) power. In other embodiments, the power output provides alternating current (AC) power and includes a power inverter to transform DC power to AC power. As the portable lighting tower 100 includes the power output 164, the user can better utilize the batteries 500 to power other external power equipment. In one embodiment, the power output 164 is a three pronged power plug-in.

Referring now to FIGS. 3-4, the adjustable mast 136 is shown in more detail. In use, the adjustable mast 136 may be lowered and raised between the storage configuration 133 (FIG. 1) and the deployed configuration 134 (FIGS. 2-3). As best seen in the deployed configuration 134, the adjustable mast 136 includes multiple members 304 that telescope to raise and lower the adjustable mast 136. For example, when lowering the adjustable mast 136, the top member 304 lowers inside of the middle member 304, both of which lower inside of the bottom member 304, and so on. More or fewer members 304 may be used. In this way, the bottom member 304 has the largest diameter, and the top member 304 has the smallest diameter.

Two light assemblies 140 are also shown in FIG. 4, with emphasis on the various movements of the adjustable frame 148. As shown, each adjustable frame 148 allows the light assemblies 140 to be tilted, turned, and even moved. Tilting and turning the light assemblies 140 allow for a user to position a beam of light as desired. In further embodiments, the adjustable frame 148 may be mechanically controlled by an electric motor for tilting and turning of the light assembly 140. The electric motor may be controlled by the controller 608 discussed further herein (e.g., in response to a user input and/or automatic controls based on other gathered signals from the lighting tower 100).

Referring now to FIG. 5, the battery 500 (e.g., a lithium-ion battery, a lead acid battery, a capacitor, multiple batteries or capacitors, or other suitable energy storage devices) is shown, according to an exemplary embodiment. The battery 500 may be used within the portable lighting tower 100 and may include one or more battery cells (e.g., lithium-ion cells). The battery 500 includes a housing 504. The housing 504 is an exterior enclosure for housing (i.e., protecting) the interior components of the battery 500. In some embodiments, the housing 504 is made of a high friction material allowing the user to easily grip the battery 500. In other embodiments, the housing 504 includes one or more grips that are high friction locations on the housing 504 structured for the user to grab. The housing 504 includes a negative terminal 508, a data connection terminal 512, and a positive terminal 516. The data connection terminal 512 is positioned between the two terminals 508 and 516. In some embodiments, the data connection terminal 512 is located elsewhere on the housing 504. The data connection terminal 512 may provide protection for short-circuiting the positive terminal 516 and the negative terminal 508. The battery 500 may yield a voltage of approximately 48 Volts (V) and 5,000 Watt-hours (Wh) of energy. In another embodiment, the battery 500 may yield a voltage of approximately 48V and 10,000 Wh of energy. In further embodiments, the voltage of the battery 500 may range from 12V to 96V. Each battery 500 is removably and electrically coupled to the portable lighting tower 100. In some embodiments, each battery 500 is removable and replaceable without the use of tools. In one embodiment, the portable lighting tower 100 includes two or more batteries 500. In another embodiment, the portable lighting tower 100 includes two batteries 500. In even another embodiment, the portable lighting tower 100 includes a single battery 500.

Figure 6:
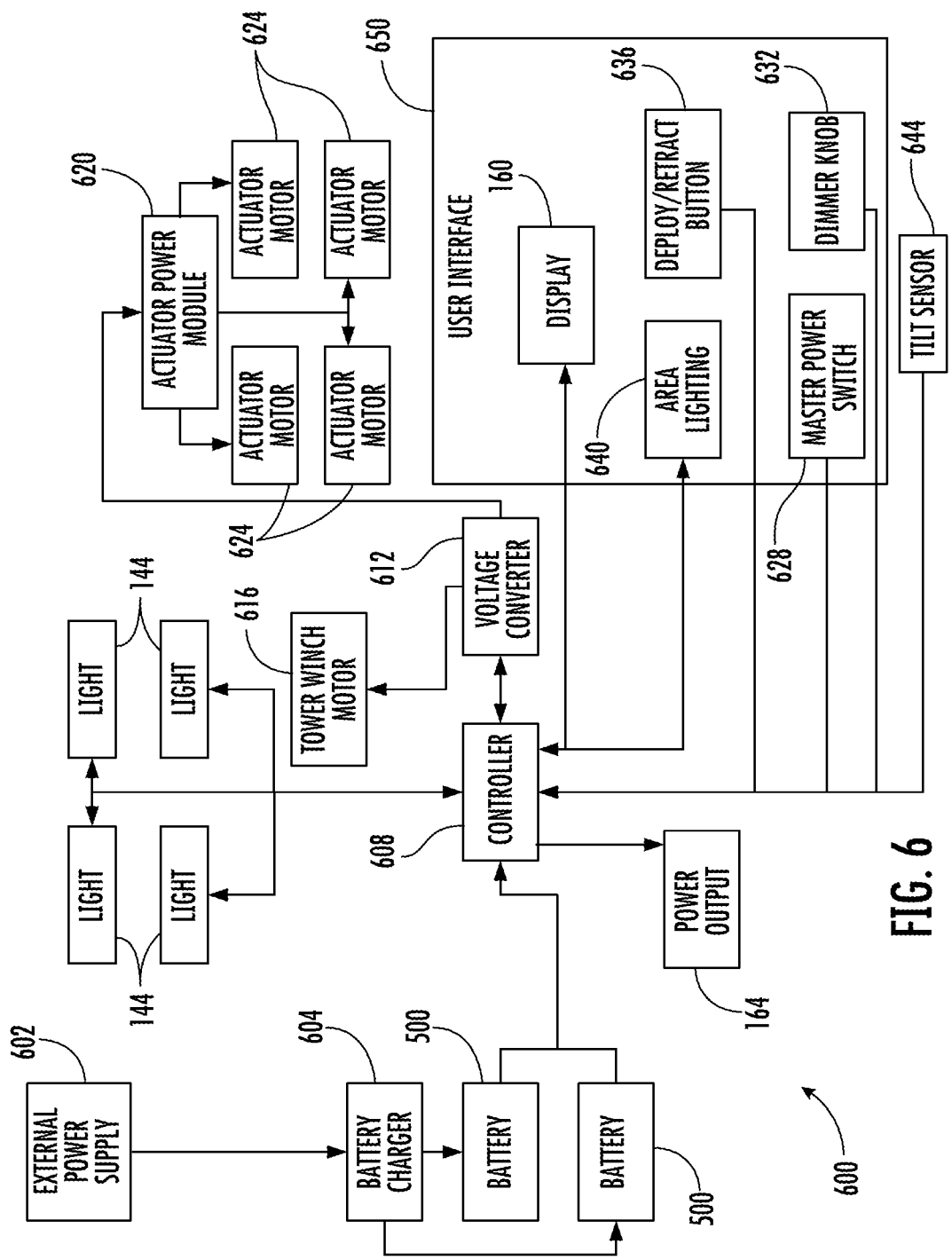
FIG. 6 is a block diagram of an electrical system of the portable lighting tower of FIG. 1.

Referring now to FIG. 6, a block diagram of an electrical system 600 of the portable lighting tower 100 is shown, according to an exemplary embodiment. Herein, the connections and arrows between blocks may refer to an electrical coupling, a communicative coupling, an operable coupling, a physical coupling, or a combination of one or more couplings. The electrical system 600 includes the batteries 500, an external power supply 602, a battery charger 604, a controller 608, a voltage converter 612, a tower winch motor 616, a tower actuator power module 620, multiple actuator motors 624, the lights 144, a tilt sensor 644, and a user interface 650. The batteries 500 are charged from a battery charger 604 that receives its power from an external power supply 602. In some embodiments, the external power supply 602 is a 120V AC power supply, and the battery charger 604 includes an inverter that converts the 120V AC power to 48 V DC power. In further embodiments, the external power supply 602 is a 240V AC power supply, and the battery charger 604 includes an inverter that converts the 240 V AC power to 48 V DC power. In even other embodiments, the external power supply 602 provides DC power, and the battery charger 604 includes a DC to DC Voltage converter.

Power from the batteries 500 is provided to the controller 608 (i.e., the batteries 500 are electrically coupled to the controller 608). In some embodiments, the controller 608 determines a battery capacity (e.g., charge) of the batteries 500 and will only receive power from the batteries 500 if they have a similar capacity. For example, if one battery 500 is charged 30% and another is charged 75% of full power, the controller 608 may determine this difference is too large and not allow both batteries 500 to operate. In some embodiments, in the situation above, the controller 608 may receive power from one battery 500 at a time if the capacity of the batteries 500 is not similar. The functions and circuits of the controller 608 will be described further herein. The controller 608 is electrically coupled to a voltage converter 612 and the lights 144. The voltage converter 612 is configured to change the voltage of the DC power provided by the controller 608 to another DC voltage. In one embodiment, the voltage converter 612 converts a 48V DC power provided by the controller 608 to 12V DC power. In another embodiment, the voltage converter 612 converts a 12V DC power provided by the controller 608 to 48V DC power.

The controller 608 is structured to control the power to the lights 144. In one embodiment, the lights 144 are light emitting diodes (LED). Because the lights 144 are LED, the lights 144 take less power than is normally required to illuminate incandescent lights. For example, each light 144 may only require 320 watts (W) per fixture while providing 38,500 Lumens of light. In another example, each light 144 may require only 250 W per fixture while providing 38,500 Lumens of light. In other examples, each light 144 may require only 350 W per fixture. Additionally, as the lights 144 require little power, the batteries 500 can keep the lights 144 lit for a longer period of time on the same battery capacity. The amount of light produced by each light 144 is dimmable based on the power received by each light 144. Therefore, in one embodiment, the user may directly adjust the power supplied to the lights 144 based on a variety of factors including required runtime, needed light, and time of day. As described further herein, the lights 144 may also be adjusted (e.g., by controller 608) without user input.

Power is provided to a tower winch motor 616 and an actuator power module 620. Accordingly, the tower winch motor 616 and the actuator power module 620 are both electrically coupled to the one or more batteries 500 to receive power. The tower winch motor 616 is an electric motor coupled to the tower winch 152 and provides power to the tower winch 152 to deploy or retract the adjustable mast 136. In some embodiments, the tower winch motor 616 is electrically and/or communicably coupled to the controller 608 and does not receive power from the voltage converter 612.

The actuator power module 620 receives power from the voltage converter 612 and powers the multiple actuator motors 624. In one embodiment, the actuator power module 620 is a controller that controls the positioning of each actuator motor 624. In further embodiments, the actuator power module 620 is a power hub that receives communicable signals from the controller 608 to control the positioning of each actuator motor 624. Each actuator motor 624 is an electric motor located within each linear actuator 128. Each actuator motor 624 actuates a respective linear actuator 128 and thereby moves the respective support 120 and foot 132. Both the tower winch motor 616 and the actuator motors 624 may be controllable between an infinite number of positions between full extension (e.g., fully deployed) and full contraction (e.g., fully stored). In this way, the controller 608 can finely control the positioning and speed of the actuator motors 624 and the tower winch motor 616.

The controller 608 receives user input from the user interface 650 and is communicably and electrically coupled to the display 160, a master power switch 628, a dimmer knob (i.e., dimmer control) 632, a deploy/retract button (i.e., deploy/retract control) 636, an area lighting 640, and a tilt sensor 644. The master power switch 628 is communicably and/or electrically coupled to the controller 608 and/or the batteries 500 to control power output to the portable lighting tower 100. In one embodiment, the master power switch 628 is an on/off switch. When in an "on" position, components of the electrical system 600 (e.g., the lights 144, the controller 608, and/or an actuator power module 620) receive power from the batteries 500. When in an "off" position, the components of the electrical system 600 (e.g., the lights 144, the controller 608, and/or the actuator power module 620) do not receive power from the batteries 500. In some embodiments, the master power switch 628 is an electrical gate that physically cuts power off from the batteries 500 when "off" and electrically couples the batteries 500 to the controller 608 when "on."

The dimmer knob 632 is communicably coupled to the controller 608 to control the light output of the lights 144. In one embodiment, the dimmer knob 632 is a physical knob that is adjustable between a full on-setting. The full-on setting indicating a maximum amount of light output (e.g., a maximum setting) of the lights 144 and a full-off setting. The full-off setting indicating a minimum amount of light output (e.g., a minimum setting) of the lights 144. In another embodiment, the dimmer knob 632 is an adjustable digital control between full output of the lights 144 and no output of the lights 144. As such, the user can adjust the dimmer knob 632 to a specified light output of the lights 144. In other embodiments, there are multiple dimmer knobs 632, one for every light assembly 140. As will be described in greater detail herein, the dimmer knob 632 may be controlled by the controller 608 to control the power requirement of the lights 144. In one such embodiment, the user may input a required (or desired) runtime of the lights 144. To meet the input runtime, the controller 608 may regulate the power received by the lights 144, thereby controlling the light output of the lights 144. Using automatically dimmable lights, the runtime of the lighting tower 100 can be greatly increased (e.g., from approximately 2 hours of runtime to 12 hours of runtime on a low setting (about 30% power relative to the highest setting)). As the lights 144 are dimmable between a maximum setting and a minimum setting, the user can finely control the amount of light being produced by the lights 144.

The deploy/retract button 636 is communicably coupled to the controller 608 to control both the tower winch motor 616 and the actuator motors 624. As will be described further herein, the deploy/retract button 636 may provide a single button that changes the configuration (e.g., deploys or retracts) the lighting tower 100. In one embodiment, the deploy/retract button 636 is a push button the user must hold to change the configuration (e.g., deployed or stored) of the lighting tower 100. The deploy/retract button 636 may communicate a selection or input to the controller 608, which may then command all of the actuator motors 624 to operate. Once fully deployed or retracted, the controller 608 may then command the tower winch motor 616 to operate and raise/lower the adjustable mast 136. If during any time, the user takes their finger/hand off the deploy/retract button 636, this may be communicated to the controller 608 and all operation of the tower winch motor 616 and/or the actuator motors 624 will be stopped. In even other embodiments, the deploy/retract button 636 may also level the supports 120 to provide an even lighting setup. In this way, the controller 608 may communicate with a tilt sensor 644 to receive tilt indications or signals. In some embodiments, the tilt sensor 644 is an accelerometer or gyroscope sensor configured to determine position of the tilt sensor 644 relative to horizontal (e.g., relative to a direction substantially perpendicular to the force of gravity). In another embodiment, the tilt sensor 644 is a position sensor that determines the location of the portable lighting tower 100 relative to horizontal such as an eddy-current sensor, a Hall Effect sensor, an inductive sensor, a Piezo-electric transducer, or a potentiometer.

The area lighting 640 may provide lighting to the user of the user interface 650 before the lights 144 are turned on. In one embodiment, when the master power switch 628 is turned "on" the area lighting 640 receives power to light up the user interface 650 for the user. In another embodiment, a separate area lighting 640 is provided on the user interface 650. In this way, the user may turn the master power switch 628 "on", may turn on the area lighting 640, and may then see the user interface 650 to interface with the portable lighting tower 100. The user may then turn off the area lighting 640 to save power and maximize runtime of the portable lighting tower 100. In further embodiments, the area lighting 640 is supplemented by user interface lighting. The area lighting 640 providing light to the area around the portable lighting tower 100, and the user interface lighting providing power directly to the user interface 650. In some embodiments, the area lighting 640 includes a proximity or motion sensor, where a user is detected upon approach to the lighting tower 100 such that the user interface 650 or area surrounding the user interface 650 lights up once a user approaches.

The display 160 is a display screen that is communicably and electrically coupled to the controller 608. The display 160 can act as a user input/output device. Accordingly, the display 160 provides a variety of information to a user of the portable lighting tower 100 including information on remaining runtime, various settings of the portable lighting tower 100, and other relevant information. In some embodiments, the displays 160 are touch screens that allow the user to input information through touch. For example, the controls of the user interface 650 described herein (e.g., the deploy/retract button 636, the dimmer knob 632, the area lighting button) may be buttons located on the display 160. In this way, the user can receive information from the display 160 and provide information to the display 160.

Figure 7:
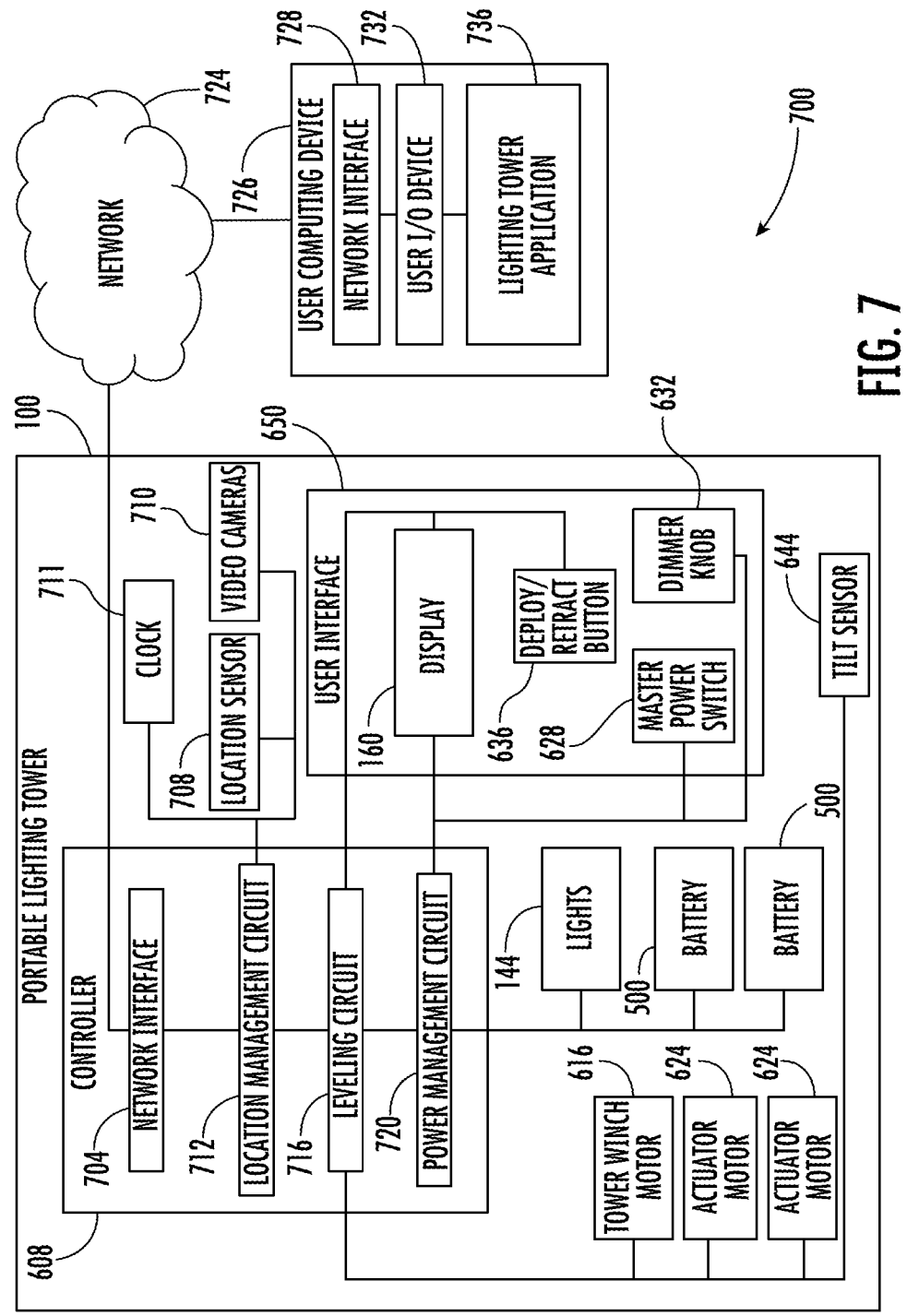
FIG. 7 is a block diagram of a control system of the portable lighting tower of FIG. 1.

Referring now to FIG. 7, a block diagram of a control system 700 of the lighting tower 100 is shown according to an exemplary embodiment. The control system 700 includes the lighting tower 100 and a user computing device 726 communicably coupled via a network 724. The network interface 704 enables the lighting tower 100 (e.g., the controller 608 and the circuits of the controller 608) to exchange information over the network 724. The network 724 provides a communicable coupling between a user computing device 726 and the controller 608 through a network interface 728 and the network interface 704. The network 724 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 724 includes the Internet. In some embodiments, the lighting tower 100 can include a gateway such that the tower 100 provides network/cellular connection to other equipment proximate the lighting tower 100. In addition, the lighting tower 100 can include an Internet-of-Things gateway enabling communication between the lighting tower 100 and other proximate equipment.

The user computing device 726 is a computing device associated with the user of the portable lighting tower 100. The user computing device 726 includes any type of computing device that may be used to receive information controller 608. In some arrangements, the user uses the user computing device 726 to communicate with various third party computing systems (not shown). Third party computing systems may, for example, provide a social media platform enabling the user to communicate with various other users, a search engine enabling the user to locate and access information, and the like. In this regard, the user computing device 726 may include any wearable or non-wearable device. Wearable devices refer to any type of device that an individual wears including, but not limited to, a watch (e.g., smart watch), glasses (e.g., eye glasses, sunglasses, smart glasses), bracelet (e.g., a smart bracelet), etc. User computing device 726 may also include any type of mobile device including, but not limited to, a phone (e.g., a smart phone), tablet, personal digital assistant, and/or computing devices (e.g., desktop computer, laptop computer, personal digital assistant). In even other embodiments, the user computing device 726 may be a remote control that communicates wirelessly with the network interface 704 of the controller 608.

In some embodiments, the user computing device 726 includes a network interface 728 enabling the user computing device 726 to exchange information over the network 724, a user input/output ("I/O") device 732, and a lighting tower application 736. The user I/O device 732 includes hardware and associated logics configured to enable the user computing device 726 to exchange information with the user. An input device or component of the user I/O device 732 allows the user to provide information to the user computing device 726, and may include, for example, a mechanical keyboard, a touchscreen, a microphone, a camera, a fingerprint scanner, any user input device engageable with the user computing device 726 via a USB, serial cable, Ethernet cable, and so on. An output device or component of the user I/O device 732 allows the user to receive information from the user computing device 726, and may include, for example, a digital display, a speaker, illuminating icons, LEDs, and so on.

In some embodiments, the lighting tower application 736 is a separate software application implemented on the user computing device 726. The lighting tower application 736 may be downloaded by the user computing device 726 prior to its usage, hard coded into the memory of the user computing device 726, or be a web-based interface application such that the user computing device 726 may provide a web browser to the application, which may be executed remotely from the user computing device 726. In the latter instance, the user may have to log onto or access the web-based interface before usage of the applications. The lighting tower application 736 may include program logics that cause the user computing device 726 to provide various prompts, notifications, and information requests to the user through the user I/O device 732.

The power management circuit 720 is communicably and operatively coupled to the batteries 500, the lights 144, the dimmer knob 632, the master power switch 628, the network 724 by the network interface 704, all other circuits of the controller 608 (e.g., the location management circuit 712, the leveling circuit 716, and the network interface 704), and the display 160. In one embodiment, the power management circuit 720 monitors the batteries 500 to determine the remaining runtime of the batteries 500 and the various components they are powering. For example, the power management circuit 720 may determine the remaining battery capacity of the batteries 500 at one moment in time, then at a second, later, moment in time. From that determination, the power management circuit 720 can calculate the remaining runtime of the batteries 500. The power management circuit 720 may then communicate the remaining runtime of the batteries 500 to the user through the display 160 or the lighting tower application 736 through the user I/O device 732. In another embodiment, the power management circuit 720 receives a requested runtime of the batteries 500 from the user through the display 160, the lighting tower application 736 through the user I/O device 732, or another member of the user interface 650. The power management circuit 720 may then determine a difference between the estimated remaining runtime and the requested runtime of the batteries 500. The power management circuit 720 may then dim the lights 144, by providing less power to the batteries 500, while continually determining the estimated remaining runtime of the batteries 500. Once the remaining runtime and the requested runtime are equal, the power management circuit 720 may stop dimming the lights. If, the lights 144 cannot be dimmed anymore and the remaining runtime is still less than the requested runtime, the power management circuit may be configured to notify the user of such via the display 160 or the lighting tower application 736 through the user I/O device 732.

In another embodiment, the power management circuit 720 provides power to the lights 144 based on the dimmer knob 632. For example, if the dimmer knob 632 is at the maximum light setting, the power management circuit 720 provides maximum power to the lights 144. In another embodiment, the user interface 650 or the lighting tower application 736 through the user I/O device 732 may include a dimmer knob override button. When the dimmer knob override button is "on" the power management circuit 720 may control power provided to the lights 144 based on a requested runtime and not on the dimmer knob. When the dimmer knob override button is "off" the power management circuit 720 may control provided to the lights 144 based on the dimmer knob 632. Additionally, the power management circuit 720 may be communicably and operably coupled to the master power switch 628. When "off" the power management circuit 720 may not provide power to any of the components of the electrical system 600 or the control system 700.

Still referring to FIG. 7, the controller 608 further includes a location management circuit 712, a leveling circuit 716, and a power management circuit 720. The power management circuit 720 is electrically and operatively coupled to the batteries 500. As a result, the power management circuit 720 may determine the battery capacity (e.g., electrical charge) of each battery 500. In some embodiments, the power management circuit 720 will only receive power from all of the batteries 500, at the same time, if they have a similar capacity. For example, if one battery 500 is charged 30% and another is charged 75% of full power, the power management circuit 720 may determine the capacity difference of the two batteries 500 is too large and not allow both batteries to operate at the same time. In some embodiments, in the situation above, the power management circuit 720 may receive power from one battery 500 at a time if the capacity of the batteries 500 is not similar. In another embodiment, the power management circuit 720 may receive power from the batteries 500 sequentially (e.g., from a battery 500 with the highest battery capacity first, and then the battery 500 with the second highest battery capacity and so on) until all batteries 500 have been exhausted of battery capacity.

The location management circuit 712 is communicably and operatively coupled to the network 724 by the network interface 704, the location sensor 708, the video cameras 710, a clock 711, the lights 144, the other circuits of the controller 608, and the display 160. The location management circuit 712 is configured to manage all controls related to the location of the portable lighting tower 100. In one embodiment, this includes the position (e.g., the weather, the environment) of the portable lighting tower 100 and the time of day. In one embodiment, the location sensor 708 provides location data to the location management circuit 712. For example, the location sensor 708 may be a global positioning system (GPS) tracking device that determines approximate location based on GPS signals. The location management circuit 712 may then transmit this data over the network 724 to an external weather provider. The external weather provider may then provide relevant weather data (e.g., wind speed, temperature, cloud conditions, rain/snow) to the location management circuit 712 over the network 724. The location management circuit 712 may utilize this data in a variety of ways. For example, in one embodiment, the location management circuit 712 may provide this data to the user via the display 160 or the lighting tower application 736 through the user I/O device 732. In another embodiment, the location management circuit 712 may provide the data to one of the circuits of the controller 608 to utilize this information.

Still referring to FIG. 7, the location management circuit 712 may be further communicably coupled to one or more video cameras 710. In one embodiment, the video cameras 710 are motion sensors such as light, imaging, detecting, and ranging sensors (LIDAR). The video cameras 710 may be utilized in multiple ways. In one embodiment, the video cameras 710 detect movement and act as security cameras. For example, the portable lighting tower 100 may be left in an overnight capacity at a jobsite with valuable equipment. As well as lighting the jobsite for safety concerns, the video cameras 710 can also be setup to detect movement. In this way, the cameras 710 may monitor the equipment surrounding the lighting tower 100. The cameras 710 may then transmit this information (e.g., video, pictures, notification) to the location management circuit 712, which may in turn transmit this data over the network 724 to user through the lighting tower application 736 through the user I/O device 732. For example, this could appear as a notification on a screen of the user computing device 726. In another embodiment, the video cameras 710 may be utilized to determine if anyone is near the lighting tower 100. For example, the video cameras 710 could be orientated in such a way that the cameras detect movement at or near the lighting tower 100. In one embodiment, if the video cameras 710 notice movement at or near the lighting tower 100, this information is transmitted to the location management circuit 712. The location management circuit 712 may then provide this information to one of the circuits of the controller 608 such as the leveling circuit 716. In even another embodiment, the video cameras 710 may be configured to detect the quantity of visible light near the portable lighting tower 100. For example, the user could set a required jobsite lighting intensity via the display 160 or the lighting tower application 736 through the user I/O device 732. The video cameras 710 could then detect the amount of light on the jobsite (near the portable lighting tower 100) and provide this information to the location management circuit 712. The location management circuit 712 could then compare the required amount of light with the amount of light on the jobsite and automatically adjust the lights 144 to provide the correct amount of light. This is advantageous as it can lead to a longer runtime of the batteries 500 and can provide the user with the knowledge and proof of how much light was being provided by the lights 144 or within a specified area at any time. In another embodiment, the location management circuit 712 could provide this information to the user through the display 160 or the lighting tower application 736 through the user I/O device 732.

The location management circuit 712 may be communicably coupled to a clock 711. The clock 711 keeps track of time (e.g., second, minute, day, month, and/or year). In one embodiment, the clock 711 communicates with the location sensor 708 and determines a time zone of the portable lighting tower 100. The clock 711 may then set the time to match the time zone. In another embodiment, the clock 711 intermittently matches up its time with a time received form the network 724. The time of the clock 711 may then be communicated to the location management circuit 712 and to the user via the display 160. In another embodiment, the location management circuit 712 may receive instructions from the user via either the display 160 or the lighting tower application 736 through the user I/O device 732. The instructions may instruct the location management circuit 712 to activate and deactivate the lights 144 at a specified time. For example, a user using the lighting tower application 736, may instruct the location management circuit 712 to turn the lights on at 7 P.M. and to turn the lights off at 6 A.M. The location management circuit 712 may then detect that the time is 6 A.M., the provided light deactivation time, and turn the lights 144 off. The lights 144 may then stay off until the location management circuit 712 via the clock 711 detects that the time is 7 P.M., the provided light activation time. The location management circuit 712 may then turn the lights 144 on. In this example, user input was provided by the lighting tower application 736. In another embodiment, user input could be provided by the user interface 650. In even another embodiment, the user interface and/or the lighting tower application 736 could have an automatic light activation button. When "on", the location management circuit 712 may communicate with the location sensor 708 to receive location data, then using the location data the location management circuit 712 may communicate with a weather provider. The weather provider may then communicate times for both sunrise and sunset at the location provided over the network 724 to the location management circuit 712. With this information and using the clock 711, the location management circuit 712 can detect when it is sunset and turn the lights 144 on. Using the same information and the clock 711, the location management circuit 712 can also detect when it is sunrise and turn the lights 144 off.

Still referring to FIG. 7, the leveling circuit 716 is communicably and operatively coupled to the tower winch motor 616, the actuator motors 624, the tilt sensor 644, the location management circuit 712, the clock 711, the display 160, the network 724 by the network interface 704, the circuits of the controller 608, and the deploy/retract button 636. The leveling circuit 716 is configured to level the supports 120 and therefore the portable lighting tower 100. In some embodiments, the display 160 or the lighting tower application 736 includes a leveling switch or button that allows the user to select if they want the leveling circuit 716 to level the supports 120 automatically or if they want to level the supports 120 manually. If the button or switch is "on", the leveling circuit 716 may automatically change configurations and level the lighting tower 100 in response to a user input. In one embodiment, the leveling circuit 716 requires constant input from a user to deploy or retract the support 120 and level the lighting tower 100. For example, the leveling circuit 716 may require a user to hold the deploy/retract button 636 of the user interface 650 to deploy or retract the portable lighting tower 100. In another embodiment, the leveling circuit 716 may require the user to respond to a prompt during deployment and leveling or retracting of the lighting tower 100 (e.g., press "okay" on the display 160 to continue deployment.) If no response is received, the leveling circuit 716 may stop leveling the lighting tower 100 and deploying or retracting the lighting tower 100. If the leveling switch or button is "off" and the deploy/retract button 636 is pressed, the leveling circuit 716 may notify the user by the display 160 or the lighting tower application 736 that the leveling switch or button is "off".

The leveling circuit 716 may be communicably coupled to the clock 711, or the location management circuit 712, to receive the information provided by the clock 711. In one embodiment, the location leveling circuit 716 may receive instructions from the user via either the display 160 or the lighting tower application 736. The instructions may instruct the location leveling circuit 716 to auto-deploy and level or auto-retract the lighting tower 100 at a specified time. For example, a user via the user computing device 726 using the lighting tower application 736, may instruct the leveling circuit 716 to auto-retract the portable lighting tower 100 at 5:50 A.M. and to auto-deploy and level the lighting tower at 6:50 P.M. The leveling circuit 716 may then detect that the time is 5:50 A.M., the provided auto-retract time, and auto-retract the lighting tower 100. The lighting tower 100 may then stay retracted until the leveling circuit 716 detects that the time is 6:50 P.M., the auto-deploy and level time. The leveling circuit 716 may then auto-deploy and level the lighting tower 100. In this example, user input was provided by the lighting tower application 736. In another embodiment, user input could be provided by the user interface 650.

In another embodiment, the leveling circuit 716 may monitor the actuator motors 624 to determine current draw of each actuator motor 624. In this way, the leveling circuit 716 may be able to determine if each foot 132 is touching the ground. To detect if each foot 132 is touching, the leveling circuit 716 and/or the actuator power module 620 can monitor the required electric current draw of each actuator motor 624. If the current draw spikes or largely increases, this can be indicative of the feet 132 touching the ground. If on uneven ground, this may happen at different times and therefore each actuator motor 624 needs to be monitored.

Figure 8:
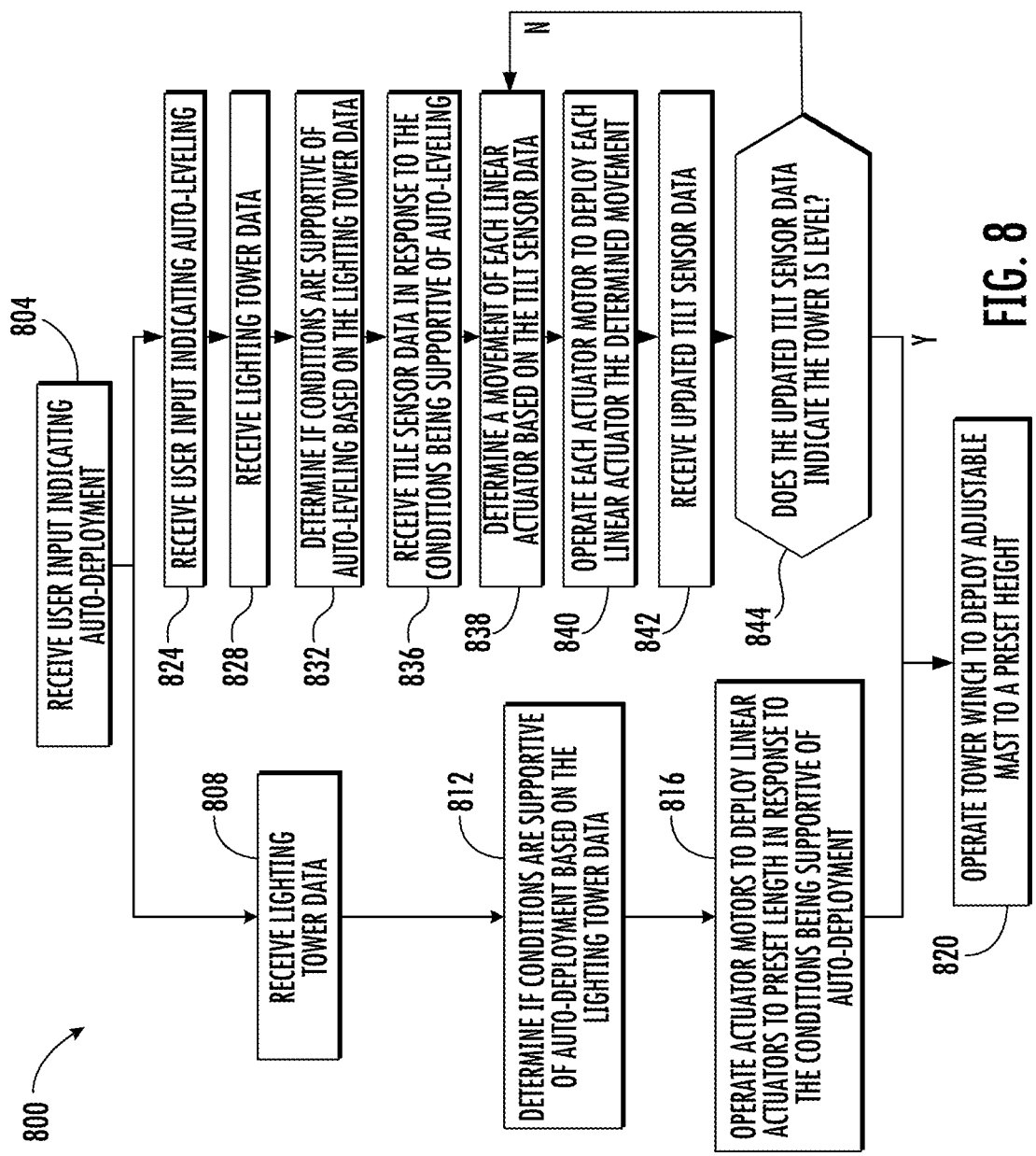
FIG. 8 is a flow diagram of a method for automatically deploying and/or leveling the portable lighting tower of FIG. 1.

Referring now to FIG. 8, a method 800 for auto-deploying and leveling the lighting tower 100 is shown according to an example embodiment. In various arrangements, the method 800 may be performed by a processor and associated logics (e.g., the leveling circuit 716, the location management circuit 712) stored in a memory of the controller 608. In some arrangements, the method 800 is initiated responsive to the controller 608 receiving an indication from the user (e.g., input into the user computing device 726 by a user I/O device 732 or input into the user interface 650) that the customer would like the lighting tower 100 to auto-deploy (e.g., auto-deployment instructions).

At 804, user input is received indicating deployment of the portable lighting tower 100. In some arrangements, the received user input is provided by at least one of the user by a user providing input to the user computing device 726 by the user I/O device 732 and the user providing input to the user interface 650 by the deploy/retract button 636. In one embodiment, the user input must be constant (e.g., the user must hold the deploy/retract button 636 or a button on the user computing device 726 for the entire duration of the method 800). In another embodiment, the leveling circuit 716 requires a first input indicating deployment followed by a second input indicating deployment. In this way, the portable lighting tower 100 will not deploy in a situation the user does not want the portable lighting tower 100 to deploy.

At 808, the leveling circuit 716 receives lighting tower data. The lighting tower data may be any form of data relating to the portable lighting tower 100. For example, the location data may include data received from the tilt sensor 644 (e.g., a grade the portable lighting tower 100 is on), data received from the clock 711 (e.g., time), data received from the location management circuit 712 (e.g., time, weather conditions, GPS data, data received from the video cameras 710), data received over the network 724 regarding the lighting tower 100 (e.g., auto-deploy time, auto-retract time, user commands,) data received from the power management circuit 720 (e.g., low power situation, high power situation,) or data received from the user interface 650 (e.g., activation of the deploy/retract button 636, information received by the display 160, user input).

At 812, the leveling circuit 716 determines if conditions are supportive of automatic deployment of the portable lighting tower 100 based on the lighting tower data received at step 808. The conditions may be the lighting tower data in comparison to built-in factors (e.g., a wind factor, a grade factor, a location factor, a distance from another object factor, or a time factor). The conditions may indicate whether the lighting tower 100 should be manually deployed instead of automatically deployed. For example, the leveling circuit 716 may receive lighting tower data from the tilt sensor 644 indicating the portable lighting tower 100 is on a large grade (e.g., >9 degrees))(°. The leveling circuit 716 may compare the lighting tower data with a built-in maximum grade, and determine that conditions are not supportive of automatic deployment. In some embodiments, if conditions are not supportive of automatic deployment the leveling circuit 716 then informs the user of such by the display 160 or the user I/O device 732 of the user computing device 726. In another example, the leveling circuit 716 may receive lighting tower data from the location management circuit 712 indicating there is a high wind speed (e.g., 30 miles per hour (MPH)). The leveling circuit 716 may compare the lighting tower data with a built-in wind rating including a maximum wind speed in which the tower can be automatically deployed. In some embodiments, if conditions are determined to not be supportive of automatic deployment, the leveling circuit 716 may instruct (by the display 160 or the user I/O device 732 of the user computing device 726) the user to manually deploy the portable lighting tower 100. In yet another example, the leveling circuit 716 may receive lighting tower data from the location management circuit 712 and from the tilt sensor 644 indicating a low wind speed (e.g., 2 MPH), a small grade (e.g., 1°), and a GPS location in a flat area (e.g., plains). The leveling circuit 716 may compare the lighting tower data with a built-in table. The leveling circuit 716 may then determine that conditions are supportive and proceed to step 816.

At step 816, the leveling circuit 716 operates the actuator motors 624 to deploy the linear actuators 128 to a preset length in response to the conditions being supportive of auto-deploy. The leveling circuit 716 may include the preset length to extend the linear actuators 128 to. The preset length may be based on an average length that results in the portable lighting tower 100 being level on flat ground (e.g., grade of approximately 0°.) In one embodiment the leveling circuit 716 communicates this information to the actuator power module 620 which operates the actuator motors 624. In another embodiment, the actuator power module 620 includes this information, and the leveling circuit 716 just sends a generic auto-deployment signal to the actuator power module 620. The actuator power module 620 then operating the actuator motors 624. In another embodiment, the leveling circuit 716 operates the actuator motors 624 directly. The leveling circuit 716 (and/or the actuator power module 620) may operate all of the actuator motors 624 at once, or command one actuator motor 624 at a time.

At 820, the tower winch 152 is operated to deploy the adjustable mast 136 to a preset height. The preset height may be based on the maximum height of the adjustable mast 136 or a maximum advertised height. In one embodiment, the leveling circuit 716 automatically operates the tower winch 152 to deploy (raise) the adjustable mast 136 to the preset height in response to the linear actuators 128 reaching a preset length. In another embodiment, the leveling circuit 716 prompts the user by the display 160 or the user I/O device 732 of the user computing device 726 to confirm the user wants to deploy the adjustable mast 136. In response to receiving confirmation from the user, the leveling circuit 716 then operate the tower winch 152 to deploy the adjustable mast 136 to the preset height.

Still referring to FIG. 8, in some arrangements the user may provide input indicating auto-leveling after providing input indicating auto-deployment. For example, directly after step 804 the display 160 or the user I/O device 732 of the user computing device 726 may present the user with a prompt. The prompt may ask the user if they want the portable lighting tower 100 to automatically level (auto-level). At step 824, the user indicates or provides input indicating they would like the portable lighting tower 100 to be automatically leveled. In another embodiment, the user interface 650 includes the leveling button or switch. If the leveling button or switch is "on" then after user input is provided at step 804, user input may be automatically provided at the step 824 indicating auto-leveling.

At 828, the leveling circuit 716 receives lighting tower data. The lighting tower data may be any form of data relating to the portable lighting tower 100. For example, the location data may include data received from the tilt sensor 644 (e.g., a grade the portable lighting tower 100 is on), data received from the clock 711 (e.g., time), data received from the location management circuit (e.g., time, weather conditions, GPS data, data received from the video cameras 710), data received over the network 724 regarding the lighting tower 100 (e.g., auto-deploy time, auto-retract time, user commands), data received from the power management circuit 720 (e.g., low power situation, high power situation), or data received from the user interface (e.g., activation of the deploy/retract button 636, information received by the display 160, user input).

At 832, the leveling circuit 716 determines if conditions are supportive of automatic-leveling of the portable lighting tower 100 based on the lighting tower data received at step 828. The conditions may be the lighting tower data in comparison to built-in factors (e.g., a wind factor, a grade factor, a location factor, a distance from another object factor, or a time factor). In some embodiments, the conditions for automatic leveling are more stringent than the conditions for automatic deployment. In this case, if the conditions are supportive of automatic leveling the conditions are supportive of automatic deployment. The conditions may indicate whether the lighting tower 100 should be manually leveled instead of automatically leveled. For example, the leveling circuit 716 may receive lighting tower data from the tilt sensor 644 indicating the portable lighting tower 100 is on a large grade (e.g., >9°). The leveling circuit 716 may compare the lighting tower data with a built-in maximum grade for leveling, and determine that conditions are not supportive of automatic leveling. In some embodiments, if conditions are not supportive of automatic leveling the leveling circuit 716 then informs the user of such by the display 160 or the user I/O device 732 of the user computing device 726. In another example, the leveling circuit 716 may receive lighting tower data from the location management circuit 712 indicating there is a high wind speed (e.g., 30 miles/hour (MPH).) The leveling circuit 716 may compare the lighting tower data with a built-in wind rating including a maximum wind speed the tower can be automatically leveled in. In some embodiments, if conditions are determined to be not supportive of automatic deployment, the leveling circuit 716 may instruct (by the display 160 or the user I/O device 732 of the user computing device 726) the user to manually deploy and automatically level the portable lighting tower 100. In other embodiments, the leveling circuit 716 may still automatically deploy the portable lighting tower 100 (starting at step 812) and inform the user they must manually level the portable lighting tower 100. In yet another example, the leveling circuit 716 may receive lighting tower data from the location management circuit 712 and from the tilt sensor 644 indicating a low wind speed (e.g., 2 MPH), a small grade (e.g., 1°), and a GPS location in a flat area (e.g., plains). The leveling circuit 716 may compare the lighting tower data with a built-in table. The leveling circuit 716 may then determine that conditions are supportive of auto-leveling and move on to a step 836.

At 836, the leveling circuit 716 receives data from the tilt sensor 644 in response to the conditions being supportive of auto-leveling. In some embodiments, the leveling circuit 716 may request the tilt sensor 644 send data in response to the conditions being supportive of auto-leveling. The data from the tilt sensor 644 may include information regarding the orientation of the portable lighting tower 100 relative to the ground. In some embodiments, the information further includes a change in orientation of the portable lighting tower 100 relative to the ground over a specified time. In some embodiments, the actuator power module 620 receives the data from the tilt 644 8n response to conditions being supportive of auto-leveling.

At 838 the leveling circuit 716 determines the movement of each linear actuator 128 based on the tilt sensor data. For example, the tilt sensor data may indicate that the lighting tower 100 is orientated toward a specified support 120. The leveling circuit 716 may determine based on the orientation of the lighting tower 100 a movement of each linear actuator 128. In the example provided, the leveling circuit 716 may determine that the specified support 120 and therefore the linear actuator 128 the lighting tower 100 is orientated toward need to extend further (become a larger length) than the other supports 120 and linear actuators 128. In some embodiments, the leveling circuit 716 may include a chart that correlates the tilt sensor data with a movement of each linear actuator 128. In even other embodiments, the leveling circuit 716 may store prior tilt sensor data and look at a historical trends in the tilt sensor data to determine the movement of each linear actuator 128. In some embodiments, the actuator power module 620 determines the movement of each linear actuator 128 based on the tilt sensor data.

Once the leveling circuit 716 has determined the movement of each linear actuator 128, the leveling circuit 716 moves to a step 840. At the step 840, the leveling circuit 716 operates the actuator motors 624 to move the linear actuators 128 to the determined movement. In one embodiment the leveling circuit 716 communicates each determined movement the actuator power module 620 which operates the actuator motors 624. In another embodiment, the actuator power module 620 receives the tilt sensor data and determines the movement length of each linear actuator 128. The actuator power module 620 then operating the actuator motors 624. In another embodiment, the leveling circuit 716 operates the actuator motors 624 directly. The leveling circuit 716 (and/or the actuator power module 620) may operate all of the actuator motors 624 at once, or command one actuator motor 624 at a time.

At a step 842, the leveling circuit 716 or the actuator power module 620 receive updated tilt sensor data from the tilt sensor 644. The updated tilt sensor data may be the same data type as the original tilt sensor data. In some embodiments, the updated tilt sensor data also includes the original tilt sensor data to compare newly measured data with the original data. In some embodiments, the updated tilt sensor data is a difference between the newly measured data and the original tilt sensor data.

At step 844, the leveling circuit 716 or the actuator power module 620 determine if the updated tilt sensor data indicates that the portable lighting tower 100 is level. In some embodiments, level is <5° of grade in all directions. In other embodiments, level is approximately 0° of grade in all directions. If the updated tilt sensor data indicates that the portable lighting tower 100 is not level, the leveling circuit 716 is configured to revert back to step 838. In some embodiments, the leveling circuit 716 keeps a count of the amount of leveling attempts (e.g., the number of times it has reverted back to step 838) and if the number becomes too large (e.g., >5 attempts), the leveling circuit 716 informs the user by the display 160 or the user I/O device 732 of the user computing device 726 that they must manually level and then deploy the portable lighting tower 100. If the updated tilt sensor data indicates that the portable lighting tower 100 is level, the leveling circuit 716 proceeds to step 820.

Overall the method 800 provides an easier operation to setup the portable lighting tower 100. Commonly, a user of a lighting tower will need to setup the lighting tower in the dark. Setup of a common lighting tower can include manually lowering supports of the lighting tower, manually leveling the supports using a level, and manually raising a mast of the lighting tower. In the dark, this can present potential hazards and can also prove mentally exhausting. The method 800 and the electronically-controlled portable lighting tower 100 allow a user to circumvent this difficulty and frustration. The user of the lighting tower 100 can auto-deploy and/or auto-level the portable lighting tower 100 through the method 800. In the dark, this saves both time and user effort. Additionally, the user does not need to add gasoline and start an engine of the portable lighting tower 100 as it utilizes the batteries 500 to instantly provide power. Lastly, as the controller 608 may communicate with the user via the user computing device 726, the user may control operation of the lighting tower 100 remotely. Therefore, no matter where the user is, they can be aware of the remaining runtime, location of, and even have video feed of the lighting tower 100.

Similarly, a method for auto-retracting the portable lighting tower 100 may be included. In various arrangements, the method for auto-retracting may be performed by a processor and associated logics (e.g., the leveling circuit 716, the location management circuit 712) stored in a memory of the controller 608. In some arrangements, the method is initiated responsive to the controller 608 receiving an indication from the user (e.g., input into the user computing device 726 by a user I/O device 732 or input into the user interface 650) that the customer would like the lighting tower 100 to auto-retract (e.g., auto-retracting instructions). To auto-retract, the leveling circuit 716 may receive a user input indicating auto-retraction. In response, the leveling circuit 716 may then operate the tower winch 152 to retract the adjustable mast 136 to a preset height. Next, the leveling circuit 716 may operate the actuator motors 624 to retract the linear actuators 128 to a preset length. In some embodiments, the leveling circuit 716 may receive lighting tower data prior to retracting the adjustable mast 136 and/or the linear actuators 128.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A portable lighting tower comprising:
    a frame;
    an adjustable mast coupled to the frame including a light;
    a controller operatively coupled to the light to control operation of the light; and
    a battery pack electrically coupled to the controller and the light,
    wherein the light is dimmable between a maximum setting and a minimum setting, wherein the controller is configured to:
        determine a remaining runtime of the battery pack,
        receive an input runtime of the battery pack, and
        dim or brighten the light based on the input runtime of the battery pack and the remaining runtime of the battery pack.

2. The portable lighting tower of claim 1, further comprising a display operatively coupled to the controller, electrically coupled to the battery pack, and configured to display the remaining runtime of the battery pack.

3. The portable lighting tower of claim 1, further comprising a plurality of legs coupled to the frame, each of the plurality of legs including an actuator operably coupled to the controller and operable to deploy and retract the respective leg, wherein the controller operates each of the actuators to deploy or retract the respective leg in response to a user input.

4. The portable lighting tower of claim 3, further comprising a deploy/retract control coupled to the controller, and wherein the user input is an actuation of the deploy/retract control.

5. The portable lighting tower of claim 3, further comprising a tilt sensor operably coupled to the controller, wherein the tilt sensor is configured to determine a grade of the portable lighting tower relative to horizontal, and wherein the controller levels the portable lighting tower in response to receiving the user input by operating each of the actuators to deploy the respective leg at a specific length based on the grade of the portable lighting tower relative to horizontal.

6. The portable lighting tower of claim 1, wherein the controller further operates the light based on a first time and a second time such that the controller turns the light on at the first time and turns the light off at the second time.

7. The portable lighting tower of claim 1, wherein the light comprises a plurality of lights, each light providing approximately 38,500 Lumens of light.

8. The portable lighting tower of claim 1, wherein the battery pack has a voltage of approximately 48 Volts and a maximum storable energy of approximately 5,000 Watt-hours.

9. The portable lighting tower of claim 1, further comprising:
    a plurality of legs coupled to the frame, each leg including an actuator operable to deploy and retract the respective leg; and
    a tilt sensor operably coupled to the controller, the tilt sensor configured to determine a grade of the portable lighting tower relative to horizontal;
    wherein the controller is operatively coupled to the light and the actuators and configured to control operation of the actuators; and
    wherein the controller operates each of the actuators to deploy or retract the respective leg in response to a user input and in response to determining the grade of the portable lighting tower relative to horizontal is less than a maximum grade.

10. The portable lighting tower of claim 9, wherein the tilt sensor is an accelerometer or a gyroscope sensor.

11. The portable lighting tower of claim 9, further comprising a deploy/retract control communicably coupled to the controller, wherein the user input is an actuation of the deploy/retract control, and wherein when the deploy/retract control is actuated, the legs are retracted and the grade of the portable lighting is less than the maximum grade, the controller operates each of the actuators to deploy the respective leg a specific length based on the grade of the portable lighting tower relative to horizontal.

12. The portable lighting tower of claim 11, wherein the adjustable mast further includes a tower winch operably coupled to the controller and operable to deploy and retract the adjustable mast, wherein the controller operates the tower winch to deploy or retract the adjustable mast.

13. The portable lighting tower of claim 12, wherein when the deploy/retract control is actuated and the legs are retracted, the controller operates the tower winch to deploy the adjustable mast.

14. The portable lighting tower of claim 1, wherein the controller is configured to dim the light until the remaining runtime is equal to the input runtime.

15. The portable lighting tower of claim 14, wherein the controller is configured stop dimming the light when the remaining runtime is equal to the input runtime.

16. The portable lighting tower of claim 14, further comprising a display operatively coupled to the controller, wherein the controller is configured provide a notification via the display when the input runtime exceeds the remaining runtime and the lights cannot be further dimmed.

17. The portable lighting tower of claim 1, further comprising a dimmer control communicably coupled to the controller and operable between a full-on setting, where a maximum amount of light is produced by the light, and a full-off setting, where a minimum amount of light is produced by the light, and wherein the controller dims or brightens the light in response to a change in position of the dimmer control.

18. The portable lighting tower of claim 17, wherein the battery pack comprises a first battery pack, wherein the portable lighting tower further comprises a second battery pack electrically coupled to the controller, the light, and the actuators, and wherein the first battery pack and the second battery pack each have a voltage of approximately 48 Volts and a maximum storable energy of approximately 5,000 Watt-hours.

\* \* \* \* \*